United States Patent [19]

Sugiyama et al.

[11] Patent Number: 5,752,895
[45] Date of Patent: May 19, 1998

[54] AUTOMATIC TRANSMISSION LOCKUP CLUTCH CONTROL APPARATUS

[75] Inventors: Hideharu Sugiyama; Ikuo Hirose; Yoshifumi Fujita, all of Shizuoka, Japan

[73] Assignee: JATCO Corporation, Fuji, Japan

[21] Appl. No.: 562,008

[22] Filed: Nov. 22, 1995

[30] Foreign Application Priority Data

Nov. 30, 1994 [JP] Japan ................... 6-297039

[51] Int. Cl.⁶ ........................................ F16H 61/14
[52] U.S. Cl. ........................................ 477/169
[58] Field of Search ........................ 477/168, 169, 477/176

[56] References Cited

U.S. PATENT DOCUMENTS

| | | | |
|---|---|---|---|
| 4,468,988 | 9/1984 | Hiramatsu | 477/169 |
| 4,947,734 | 8/1990 | Fijita et al. | 477/169 |
| 4,998,449 | 3/1991 | Baba et al. | 477/98 |
| 5,024,125 | 6/1991 | Baba | 477/98 |

FOREIGN PATENT DOCUMENTS 43 28 182  2/1994  Germany.

63-172 058  7/1988  Japan.
63-172058  7/1988  Japan.

*Primary Examiner*—Dirk Wright
*Attorney, Agent, or Firm*—Foley & Lardner

[57] ABSTRACT

An apparatus for controlling a lockup clutch provided in an automatic transmission having an impeller and a turbine. The pressure of the oil supplied to the lockup clutch is controlled by a lockup solenoid which is operable on a control signal having a variable duty cycle to operate the lockup clutch in a complete lockup mode to complete a mechanical connection between the turbine and the impeller and a released lockup mode to provide a hydrodynamic driving connection between the turbine and the impeller. In the presence of a command for a change of operation of the lockup clutch from its released lockup mode to its complete lockup mode, the initial value of the duty cycle of the control signal is set, based on at least one of conditions including the temperature of the oil, the engine load and the degree of slip permitted between the turbine and the impeller, at a value closer to the duty cycle set for the complete lockup mode of operation of the lockup clutch when the oil is in a condition causing a slow response to the duty cycle control.

11 Claims, 6 Drawing Sheets

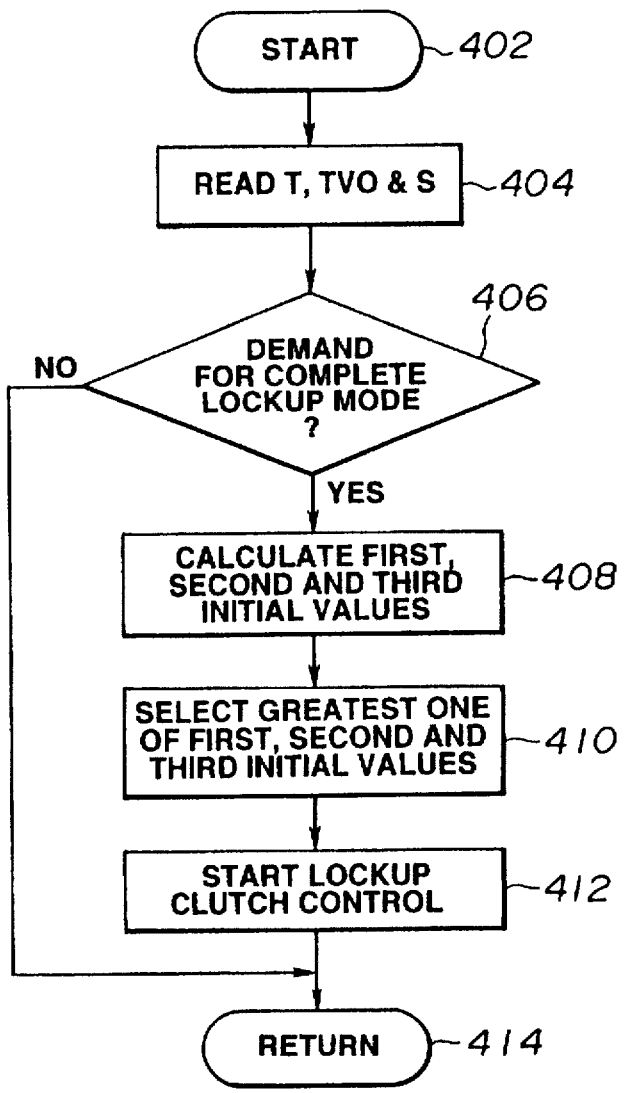

AUTOMATIC TRANSMISSION LOCKUP CLUTCH CONTROL APPARATUS

BACKGROUND OF THE INVENTION

This invention relates to an automatic transmission lockup clutch control apparatus for use with an automotive vehicle.

For example, Japanese Patent Kokai No. 63-172058 discloses an automatic transmission lockup clutch control apparatus which controls the duty ratio on which a lockup solenoid operates to control a lockup clutch provided in an automatic transmission. In practice, the lockup solenoid receives a control signal having a variable duty cycle and controls the oil pressure introduced to control the lockup clutch. The possibility exists that the time required for the lockup clutch to change its operation into the complete lockup mode is elongated under specified operating conditions. It is proposed in the Japanese Patent Kokai to eliminate this possibility by changing the oil pressure introduced to control the lockup clutch based on at least one of oil temperature, vehicle speed and engine load. However, this proposal is not satisfactory as described later in greater detail.

SUMMARY OF THE INVENTION

It is a main object of the invention to provide an improved lockup clutch control apparatus which can minimize the tendency of the time required for the lockup clutch to change its operation into the complete lockup mode to be elongated regardless of vehicle operating conditions.

Another object of the invention is to provide an improved lockup clutch control apparatus which can provide good response and good feel upon a change in the operation of the lockup clutch into the complete lockup mode.

There is provided, in accordance with the invention, a lockup clutch control apparatus for use in an automotive vehicle including an internal combustion engine and an automatic transmission having an impeller, a turbine and a lockup clutch operable in a selected one of a first mode to complete a mechanical connection between the turbine and the impeller and a second mode to provide a hydrodynamic driving connection between the turbine and the impeller. The lockup clutch control apparatus includes a lockup solenoid operable on a control signal having a variable duty cycle for controlling a pressure of a oil supplied to the lockup clutch to perform a duty cycle control of operation of the lockup clutch, first sensor means for sensing a temperature of the oil and for producing a first sensor signal indicative of a sensed oil temperature, second sensor means for sensing an engine load and for producing a second sensor signal indicative of a sensed engine load, and third sensor means for sensing a degree of the slip permitted between the turbine and the impeller and for producing a third sensor signal indicative of a sensed slip degree. The first, second and third sensor signals are fed to a control unit which thereby produces the control signal to the lockup solenoid. The control unit includes means responsive to a command for a change of operation of the lockup clutch from the second mode to the first mode for setting an initial value of the duty cycle of the control signal, based on at least one of the sensed oil temperature, the sensed engine load and the sensed slip degree, at a value closer to the duty cycle set for the first mode of operation of the lockup clutch when the oil is in a condition causing a slow response to the duty cycle control.

BRIEF DESCRIPTION OF THE DRAWINGS

The invention will be described in greater detail by reference to the following description taken in connection with the accompanying drawings, in which:

FIG. 10 is a flow diagram illustrating still another modified form of the programming of the digital computer as it is used to change the operation of the lockup clutch into its complete lockup mode.

DETAILED DESCRIPTION OF THE INVENTION

Prior to the description of the preferred embodiments of the invention, the prior art lockup clutch control apparatus disclosed in Japanese Patent Kokai No. 63-172058 is further described in order to provide a basis for a better understanding of the difficulties attendant thereon.

Figure 1:
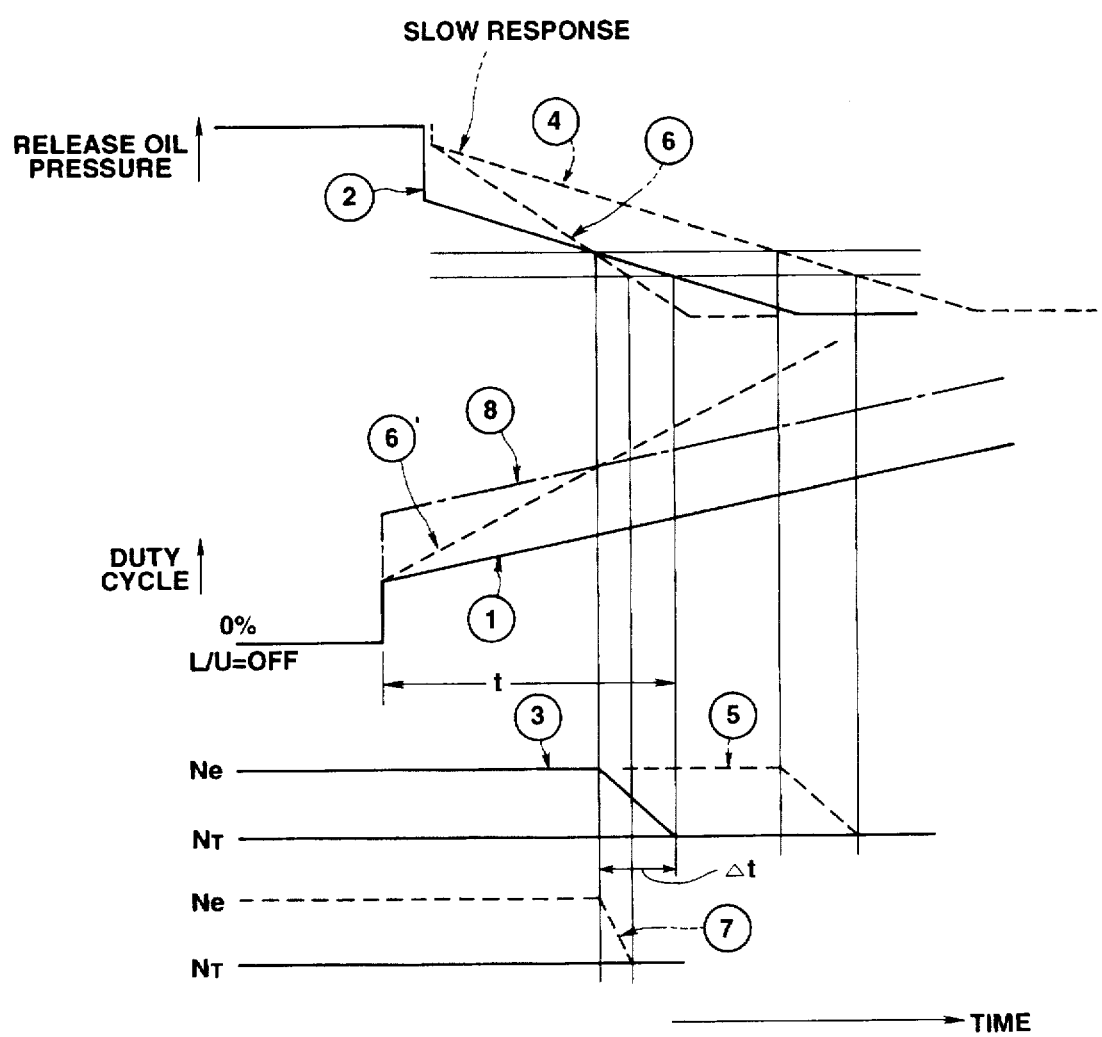
FIG. 1 is a graph used in explaining the difficulties attendant on a conventional lockup clutch control apparatus.

Assuming now that the initial value of the duty cycle of the control signal is set at a value suitable for a high oil temperature where the oil has a low viscosity, the oil pressure introduced into the torque converter release chamber changes at a good response rate, as indicated by the curve (2) of FIG. 1, with respect to changes in the duty cycle of the control signal, as indicated by the curve (1) of FIG. 1, to provide a smooth change of operation of the lockup clutch into the complete lockup mode, as indicated by the curve (3) of FIG. 1. At a low oil temperature where the oil has a high viscosity, however, the oil pressure introduced into the torque converter release chamber decreases at a slow response rate, as indicated by the curve (4) of FIG. 1, with respect to changes in the duty cycle of the control signal, as indicated by the curve (1) of FIG. 1. As a result, the time required for the lockup clutch to change its operation into the complete lockup mode is elongated, as indicated by the curve (5) of FIG. 1, to cause degraded feel and fuel economy penalty.

Figure 2:
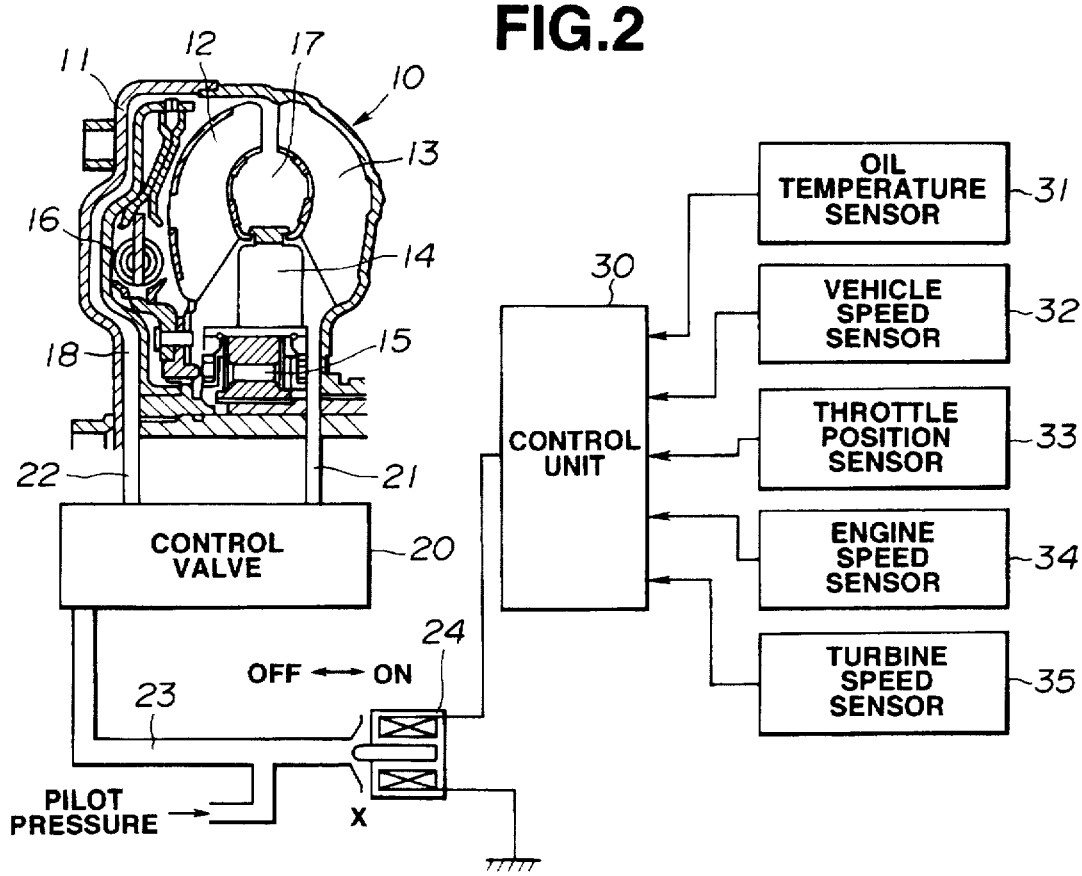
FIG. 2 is a schematic diagram showing one embodiment of a lockup clutch control apparatus made in accordance with the invention.

Referring to FIG. 2, there is shown a schematic diagram of an automatic transmission lockup clutch control apparatus embodying the invention. The lockup clutch control apparatus is used with an automotive vehicle having an internal combustion engine, and an automatic transmission having a torque converter provided with a lockup mechanism. The torque converter, generally designated by the numeral 10, includes a converter cover 11 drivingly connected to the crankshaft (not shown) of the engine. The torque converter 10 also includes a turbine 12, an impeller 13, a stator 14, and a one-way clutch 15 arranged in a manner as well known to those skilled in the art. A lockup clutch 16 carries a friction surface located at its radially outer end for driving engagement with the torque converter cover 1. The lockup clutch 16 has an apply chamber 17 on the right side thereof, as viewed in FIG. 2, and a release chamber 18 on the left side thereof, as viewed in FIG. 2, along with the torque converter cover 11. A lockup control valve 20 is provided for controlling the fluid pressure introduced through a fluid passage 21 into the apply chamber 17 and the fluid pressure introduced through a fluid passage 22 into the release chamber 18 so as to control the degree of slippage of the lockup clutch 16. The lockup control valve 20 operates on a fluid pressure supplied thereto through a fluid passage 23. The lockup clutch 16 is closed, locked, applied or engaged to complete a mechanical connection between the turbine 12 and the impeller 13 when the pressurized hydraulic fluid forces the friction surface against the torque converter cover 11. This lockup clutch operation mode is referred to as a complete lockup mode. The lockup clutch 16 can operate in a slip lockup mode to provide a mechanical connection with a controlled degree of slip permitted between the turbine 12 and the impeller 13. The lockup clutch 16 is opened, unlocked, released or disengaged so that a hydrodynamic driving connection exists between the turbine 12 and the impeller 13 when pressurized hydraulic fluid is supplied through the release chamber 18 defined between the converter cover 1 and the friction surface of the lockup clutch 16 to disengage these surfaces. This lockup clutch operation mode is referred to as a released lockup mode.

A control unit 30 is provided for controlling the lockup clutch 16. The control unit 30 controls a lockup solenoid 24 provided for controlling the fluid pressure supplied through the fluid passage 23 to the control valve 20. The lockup solenoid 24 operates on a control signal having a variable pulse width or duty cycle fed from the control unit 30. When the duty cycle of the control signal is 0 percent, the pressure differential between the apply and release chambers 17 and 18 is substantially zero and the lockup clutch 16 operates in the released lockup mode. Upon increase in the duty cycle of the control signal, the pressure difference increases to place the lockup clutch 16 in the slip lockup mode. When the duty cycle is 100 percents, the fluid pressure is introduced into the apply chamber 17 only so that the lockup clutch 16 operates in the complete lockup mode. The control unit 30 performs the lockup clutch control based upon various operating conditions including oil temperature, vehicle speed, throttle valve position, engine speed, and turbine speed. Thus, an oil temperature sensor 31, a vehicle speed sensor 32, a throttle valve position sensor 33, an engine speed sensor 34 and a turbine speed sensor 35 are connected to the control unit 30. The oil temperature sensor 31 is provided for sensing the temperature of the oil and it produces an electric signal indicative of a sensed oil temperature T. The vehicle speed sensor 32 is provided at a position for sensing the speed of rotation of the output shaft of the automatic transmission and it produces an electric signal indicative of a sensed vehicle speed VSP. The throttle valve position sensor 33 is associated with the engine throttle valve and it produces an electric signal indicative of the degree TVO to which the engine throttle valve opens. The engine speed sensor 34 is associated with the engine distributor and it produces a pulse signal of a repetitive rate proportional to the engine speed Ne. The turbine speed sensor 35 is provided at a position for sensing the speed of rotation of the turbine 12 and it produces an electric signal indicative of a sensed turbine speed Nt.

The control unit 30 may employ a digital computer which includes a central processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signals into corresponding digital signals for application to the central processing unit. The read only memory contains the programs for operating the central processing unit. The random access memory contains appropriate data in look-up tables (relationships) used in calculating an appropriate value for the duty cycle of the control signal applied to the lockup solenoid 24. A control word specifying a desired duty cycle is transferred by the central processing unit to the input/output control unit which converts it into a control signal to the lockup solenoid 24 for controlling the degree of slip permitted in the lockup clutch 16.

Figure 3:
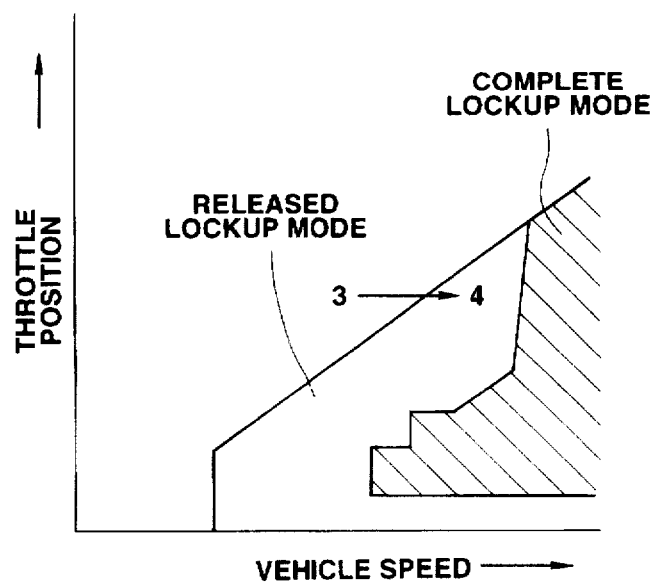
FIG. 3 is a graph of vehicle speed versus throttle valve position.

For example, the control unit 30 selects a desired one of the lockup clutch operation modes from a relationship programmed into the computer. This relationship defines a desired lockup clutch operation mode as a function of throttle valve position and vehicle speed, as shown in FIG. 3, for a change from the third speed gear to the fourth speed gear. During the lockup clutch control, a feedback control is made in a direction to gradually decrease the difference of the turbine speed Nt from the engine speed Ne.

Figure 4:
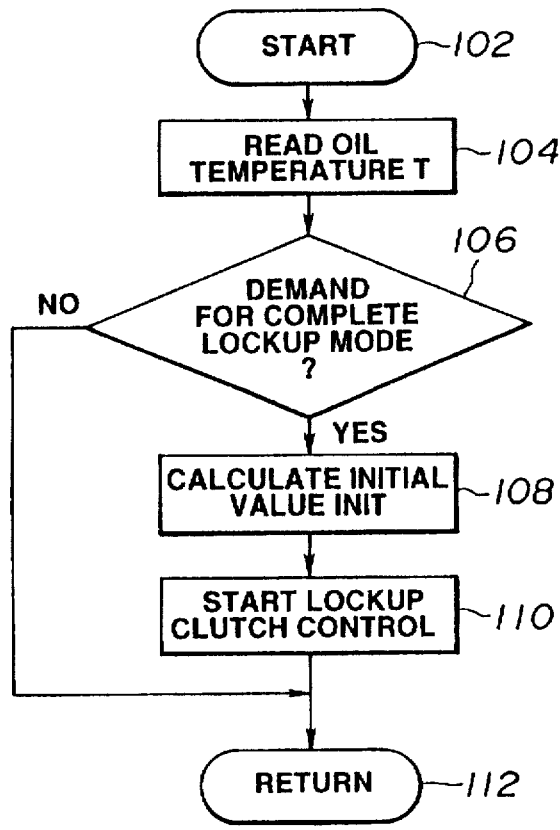
FIG. 4 is a flow diagram illustrating the programming of the digital computer as it is used to change the operation of the lockup clutch into its complete lockup mode.

FIG. 4 is a flow diagram illustrating the programming of the digital computer as it is used to control the lockup clutch 16. The computer program is entered at the point 102. At the point 104 in the program, the sensed oil temperature T is read into the computer memory. At the point 106, a determination is made as to whether or not the sensed operating conditions require for the lockup clutch 16 to operate in the complete lockup mode. If the answer to this question is "YES", then it means that the lockup clutch 16 is required to start its movement to the engaged position where the lockup clutch 16 can operate in the complete lockup mode and the program proceeds to the point 108. Otherwise, the program proceeds to the 112 where the program is returned to the point 104.

Figure 5:
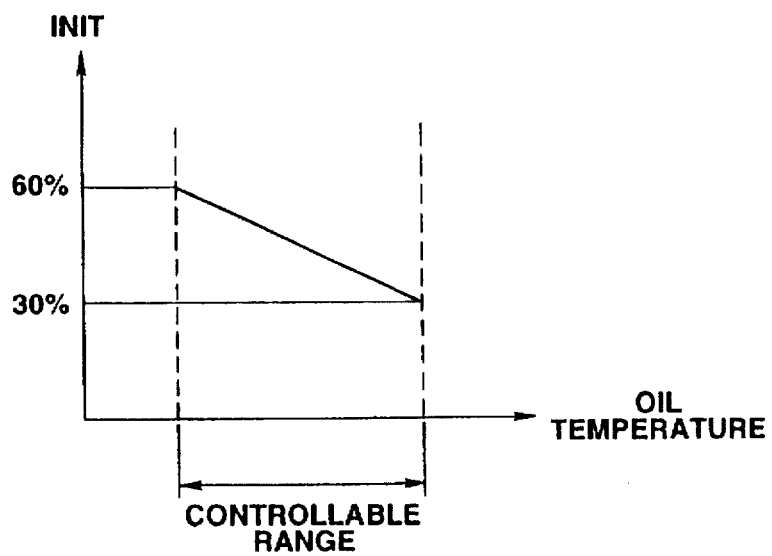
FIG. 5 is a graph of oil temperature versus duty cycle initial value.

At the point 108 in the program, an initial value INIT of the duty cycle of the control signal applied to the lockup solenoid 24 is calculated from a relationship programmed into the computer. This relationship defines the initial value INIT as a function of oil temperature T, as shown in FIG. 5. The initial value INIT is shown as having a maximum value of 60% and a minimum value of 30%. A greater initial value INIT is set for the duty cycle of the control signal applied to the lockup solenoid 24 at a lower oil temperature where the oil has such a greater viscosity as to provide a slower hydraulic pressure response. At the point 110 in the program, the calculated initial value INIT is used to start the lockup clutch control in a manner to move the lockup clutch 16 to the engaged position, that is, increasing the duty cycle of the control signal from its initial value INIT toward 100percents. Following this, the program proceeds to the point 112.

The operation of the lockup clutch control apparatus of the invention is as follows: At a low oil temperature, a small initial value is set for the lockup control duty cycle (the duty cycle of the control signal applied to the lockup solenoid 24). In this case, the lockup control duty cycle changes as indicated by the curve (1) of FIG. 1, whereas the release oil pressure (the pressure of the hydraulic fluid supplied to the release chamber 18) changes as indicated by the curve (2) of FIG. 1. Consequently, the lockup clutch can reach its engaged position in such a short time t as to provide a fast response. Since the engine speed Ne changes at such a small rate as to ensure a sufficient time Δt required for the lockup clutch to come into its engaged position. This is effective to minimize shocks which may occur during the engagement of the lockup clutch.

At a high oil temperature, a great initial value is set for the lockup control duty cycle (the duty cycle of the control signal applied to the lockup solenoid 24). In this case, the lockup control duty cycle changes as indicated by the curve (8) of FIG. 1. The release oil pressure (the pressure of the hydraulic fluid supplied to the release chamber 18) changes in a manner similar to that obtained at a low oil temperature, as indicated by the curve (2) of FIG. 1, since the duty cycle initial value INIT is set at a great value. That is, it is not required to increase the rate of change of the duty cycle of the control signal. Consequently, the lockup clutch can reach its engaged position in such a short time t as to provide a fast response. Since the engine speed Ne changes at such a small rate as to ensure a sufficient time Δt required for the lockup clutch to come into its engaged position. This is effective to minimize shocks which may occur during the engagement of the lockup clutch.

In this embodiment, it is not required to elongate the time required for the lockup clutch to change its operation into the complete lockup clutch mode regardless of vehicle operating conditions. It is, therefore, possible to provide good response and good feel upon a change in the operation of the lockup clutch into the complete lockup mode.

Figure 6:
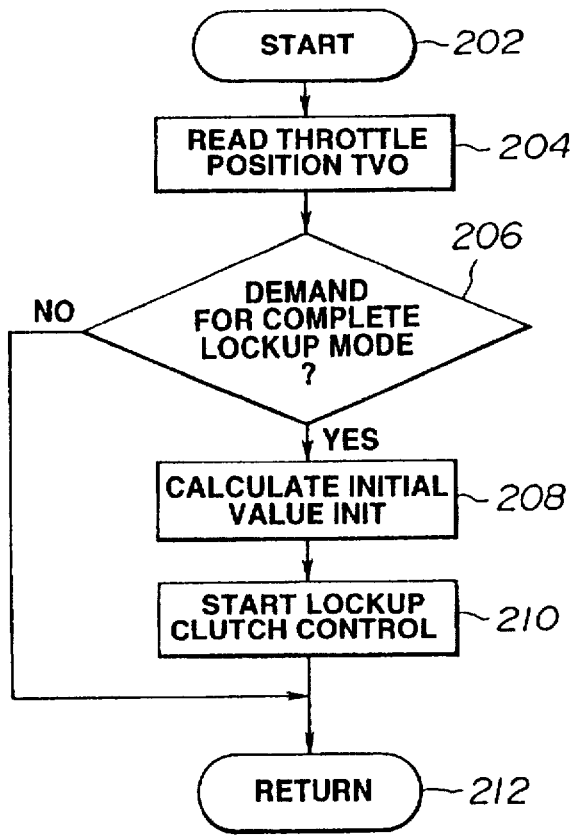
FIG. 6 is a flow diagram illustrating a modified form of the programming of the digital computer as it is used to change the operation of the lockup clutch into its complete lockup mode.

FIG. 6 is a flow diagram illustrating a modified form of the programming of the digital computer as it is used to control the lockup clutch 16. The computer program is entered at the point 202. At the point 204 in the program, the sensed throttle valve position TVO, which corresponds to the engine load, is read into the computer memory. At the point 206, a determination is made as to whether or not the sensed operating conditions require for the lockup clutch 16 to operate in the complete lockup mode. If the answer to this question is "YES", then it means that the lockup clutch 16 is required to start its movement to the engaged position where the lockup clutch 16 can operate in the complete lockup mode and the program proceeds to the point 208. Otherwise, the program proceeds to the 212 where the program Is returned to the point 204.

Figure 7:
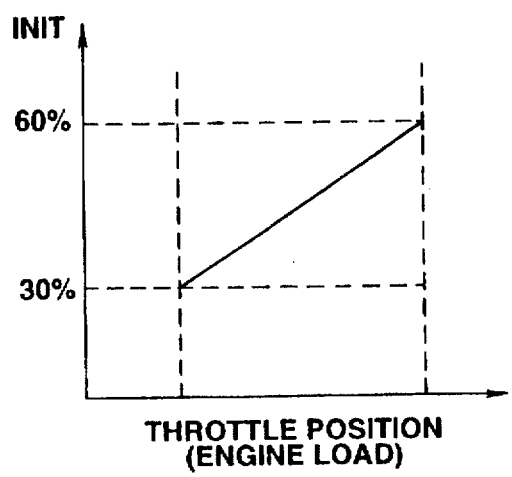
FIG. 7 is a graph of throttle valve position (engine load) versus duty cycle initial value.

At the point 208 in the program, an initial value INIT of the duty cycle of the control signal applied to the lockup solenoid 24 is calculated from a relationship programmed into the computer. This relationship defines the initial value INIT as a function of throttle valve position TVO (or engine load), as shown in FIG. 7. The initial value INIT is shown as having a maximum value of 60% and a minimum value of 30%. A greater initial value INIT is set for the duty cycle of the control signal applied to the lockup solenoid 24 at a greater throttle valve position (or greater engine load) where the torque to be transmitted has such a greater value as to provide a slower oil pressure response. At the point 210 in the program, the calculated initial value INIT is used to start the lockup clutch control in a manner to move the lockup clutch 16 to the engaged position, that is, increasing the duty cycle of the control signal from its initial value INIT toward 100 percents. Following this, the program proceeds to the point 212.

The operation of the lockup clutch control apparatus of the invention is as follows: When the throttle valve opens wide, the torque to be transmitted has such a great value as to provide a slow oil pressure response. In this case, the initial value of the lockup control duty cycle (the duty cycle of the control signal applied to the lockup solenoid 24) is set at a great value to permit the lockup clutch to reach its engaged position in such a short time as to provide a fast response. This is effective to shorten the time required for the lockup clutch to come into its engaged position. When the degree of opening of the throttle valve is small, the torque to be transmitted has such a small value as to provide a fast oil pressure response. In this case, the initial value of the lockup control duty cycle (the duty cycle of the control signal applied to the lockup solenoid 24) is set at a small value.

In this embodiment, it is not required to elongate the time required for the lockup clutch to change its operation into the complete lockup clutch mode regardless of vehicle operating conditions. It is, therefore, possible to provide good response and good feel upon a change in the operation of the lockup clutch into the complete lockup mode.

Figure 8:
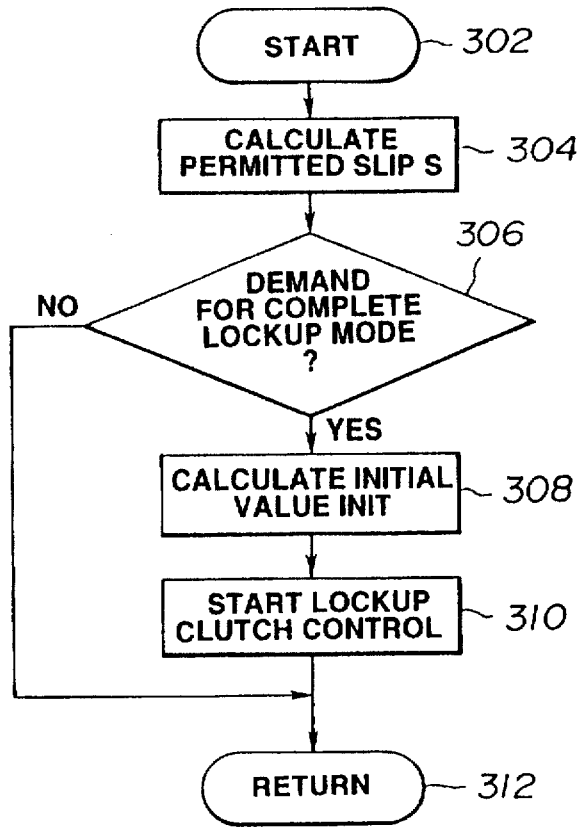
FIG. 8 is a flow diagram illustrating another modified form of the programming of the digital computer as it is used to change the operation of the lockup clutch into its complete lockup mode.

FIG. 8 is a flow diagram illustrating another modified form of the programming of the digital computer as it is used to control the lockup clutch 16. The computer program is entered at the point 302. At the point 304 in the program, the degree S of slip permitted between the turbine and the impeller is calculated based on a difference between the engine speed Ne and the turbine speed Nt. At the point 306, a determination is made as to whether or not the sensed operating conditions require the lockup clutch 16 to operate in the complete lockup mode. If the answer to this question is "YES", then it means that the lockup clutch 16 is required to start its movement to the engaged position where the lockup clutch 16 can operate in the complete lockup mode and the program proceeds to the point 308. Otherwise, the program proceeds to the 312 where the program is returned to the point 304.

Figure 9:
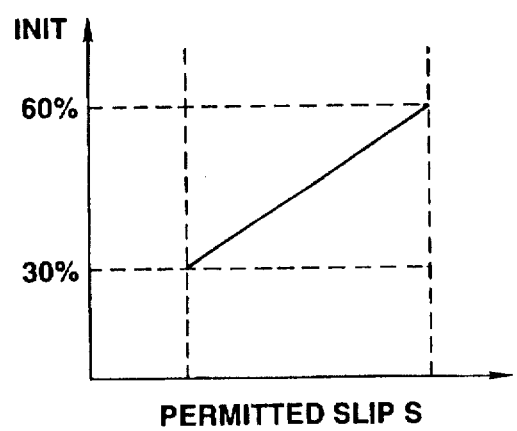
FIG. 9 is a graph of permitted degree of slip versus duty cycle initial value.

At the point 308 in the program, an initial value INIT of the duty cycle of the control signal applied to the lockup solenoid 24 is calculated from a relationship programmed into the computer. This relationship defines the initial value INIT as a function of permitted slip degree S, as shown in FIG. 9. The initial value INIT is shown as having a maximum value of 60% and a minimum value of 30%. A greater initial value INIT is set for the duty cycle of the control signal applied to the lockup solenoid 24 a such a greater slip degree S as to provide a slow oil pressure response. AL the point 310 in the program, the calculated initial value INIT is used to start the lockup clutch control in a manner to move the lockup clutch 16 to the engaged position, that is, increasing the duty cycle of the control signal from its initial value INIT toward 100 percents. Following this, the program proceeds to the point 312.

The operation of the lockup clutch control apparatus of the invention is as follows: When the degree of slip permitted between the turbine and the impeller is has such a great value as to provide a slow oil pressure response. In this case, the initial value of the lockup control duty cycle (the duty cycle of the control signal applied to the lockup solenoid 24) is set at a great value to permit the lockup clutch to reach its engaged position in such a short time as to provide a fast response. This is effective to shorten the time required for the lockup clutch to come into its engaged position. When the permitted slip degree is small, the lockup clutch can come into its engaged position in a short time. In this case, thus, the initial value of the lockup control duty cycle (the duty cycle of the control signal applied to the lockup solenoid 24) is set at a small value.

In this embodiment, it is not required to elongate the time required for the lockup clutch to change its operation into the complete lockup clutch mode regardless of vehicle operating conditions. It is, therefore, possible to provide good response and good feel upon a change in the operation of the lockup clutch into the complete lockup mode.

FIG. 10 is a flow diagram illustrating still another modified form of the programming of the digital computer as it is used to control the lockup clutch 16. The computer program is entered at the point 402. At the point 404 in the program, the sensed oil temperature T, the sensed throttle valve position TVO and the calculated slip degree S (see point 304 of FIG. 8) are read into the computer memory. At the point 406, a determination is made as to whether or not the sensed operating conditions require for the lockup clutch 16 to operate in the complete lockup mode. If the answer to this question is "YES", then it means that the lockup clutch 16 is required to start its movement to the engaged position where the lockup clutch 16 can operate in the complete lockup mode and the program proceeds to the point 408. Otherwise, the program proceeds to the 414 where the program is returned to the point 404.

At the point 408 in the program, first, second and third initial values $INIT_T$, $INIT_{TVO}$ and $INIT_S$, of the duty cycle of the control signal applied to the lockup solenoid 24 are calculated respectively from first, second and third relationships programmed into the computer. The first relationship defines the first initial value $INIT_T$ as a function of oil temperature T, as shown in FIG. 5. The initial value INIT has a maximum value of 60% and a minimum value of 30%. A greater initial value $INIT_T$ is set for the duty cycle of the control signal applied to the lockup solenoid 24 at a lower oil temperature T where the oil has such a greater viscosity as to provide a slower hydraulic pressure response. The second relationship defines the initial value $INIT_{TVO}$ as a function of throttle valve position TVO (or engine load), as shown in FIG. 7. The second initial value $INIT_{TVO}$ is shown as having a maximum value of 60% and a minimum value of 30%. A greater initial value $INIT_{TVO}$ is set for the duty cycle of the control signal applied to the lockup solenoid 24 at a greater throttle valve position (or greater engine load) where the torque to be transmitted has such a greater value as to provide a slower oil pressure response. The third relationship defines the third initial value $INIT_S$ as a function of permitted slip degree S, as shown in FIG. 9. The third initial value $INIT_S$ is shown as having a maximum value of 60% and a minimum value of 30%. A greater third initial value $INIT_S$ is set for the duty cycle of the control signal applied to the lockup solenoid 24 at such a greater slip degree S as to provide a slow oil pressure response.

At the point 410 in the program, the greater one of the first, second and third initial values $INIT_T$, $INIT_{TVO}$ and $INIT_S$ is selected. At the point 412, the selected initial value INIT is used to start the lockup clutch control in a manner to move the lockup clutch 16 to the engaged position, that is, increasing the duty cycle of the control signal from the selected initial value INIT toward 100 percents. Following this, the program proceeds to the point 414.

The parameter for which the selected initial value is calculated has the greatest effect to slow down the oil pressure response. The selected initial value is used to start the lockup clutch control. It is, therefore, possible to provide good response and good feel regardless of vehicle operating conditions upon a change in the operation of the lockup clutch into the complete lockup mode.

Although the invention has been described in connection with the vehicle operating conditions monitored by one or all of the sensed parameters including oil temperature T, engine load TVO and permitted slip degree S, it is to be understood that the vehicle operating conditions may be monitored by two of oil temperature T, engine load TVO and permitted slip degree S. In this case, the initial value for the duty cycle of the control signal applied to the lockup solenoid 24 may be set at a greater one of the initial values calculated for the two parameters.

Although the invention has been described in connection with a lockup clutch control made by changing the initial value of the duty cycle of the control signal applied to the lockup solenoid 24 without changing the rate of change of the duty cycle of the control signal, it is to be understood that the rate of change of the duty cycle of the control signal may be changed while setting the initial value at its maximum or minimum value to provide good response and good feel upon a change in the operation of the lockup clutch into the complete lockup mode when the vehicle operating conditions specify an initial value above 60 percents or below 30 percents.

Although the invention has been described in connection with a control valve 20 operable to place the lockup clutch into its engaged position in the presence of a control signal having a duty cycle of 100 percents, it is to be understood that the control valve 20 may be arranged to place the lockup clutch into its engaged position in the presence of a control signal having a duty cycle of 0 percents. In this case, the duty cycle is set to have a smaller initial value at a lower oil temperature, a greater engine load and/or a greater slip degree to provide good response and good feel upon a change in the operation of the lockup clutch into the complete lockup mode.

Although the invention has been described in connection with a complete lockup control made to change the operation of the lockup clutch is placed into its complete lockup mode, it is to be understood that the invention is also applicable to the slip lockup control made to control the oil pressure under a feedback control of the difference between the engine and turbine speeds so as to operate the lockup clutch in its slip lockup mode.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. A lockup clutch control apparatus for use in an automotive vehicle including an internal combustion engine and an automatic transmission having an impeller, a turbine and a lockup clutch operable in a selected one of a first mode to complete a mechanical connection between the turbine and the impeller and a second mode to provide a hydrodynamic driving connection between the turbine and the impeller, the control apparatus comprising:

a lockup solenoid operable on a control signal having a variable duty cycle for controlling a pressure of an oil supplied to the lockup clutch to perform a duty cycle control of operation of the lockup clutch;

a first sensor for sensing a temperature of the oil and for producing a first sensor signal indicative of a sensed oil temperature;

a second sensor for sensing an engine load and for producing a second sensor signal indicative of a sensed engine load;

a third sensor for sensing a degree of slip permitted between the turbine and the impeller and for producing a third sensor signal indicative of a sensed slip degree; and a control unit receiving the first, second and third sensor signals for producing the control signal received by the lockup solenoid, the control unit including a setting device responsive to a command for a change of operation of the lockup clutch from the second mode to the first mode for setting an initial value of the duty cycle of the control signal, based on at least one of the sensed oil temperature, the sensed engine load and the sensed slip degree, at a value closer to the duty cycle set for the first mode of operation of the lockup clutch when the oil is in a condition causing a slow response to the duty cycle control;

wherein the duty cycle increases gradually from the initial value.

2. The lockup clutch control apparatus as claimed in claim 1, wherein the setting device sets the initial value at a value closer to the duty cycle set for the first mode of operation of the lockup clutch as the sensed oil temperature decreases.

3. The lockup clutch control apparatus as claimed in claim 2, wherein the setting device sets the initial value at a value closer to the duty cycle set for the first mode of operation of the lockup clutch as the sensed engine load increases.

4. The lockup clutch control apparatus as claimed in claim 2, wherein the setting device sets the initial value at a value closer to the duty cycle set for the first mode of operation of the lockup clutch as the sensed slip degree increases.

5. The lockup clutch control apparatus as claimed in claim 2, wherein the control unit calculates a first initial value closer to the duty cycle set for the first mode of operation of the lockup clutch as the sensed oil temperature decreases, calculates a second initial value closer to the duty cycle set for the first mode of operation of the lockup clutch as the sensed engine load increases, calculates a third initial value closer to the duty cycle set for the first mode of operation of the lockup clutch as the sensed slip degree increases, and sets the initial value of the duty cycle of the control signal at a selected one of the first, second and third initial values, the selected initial value being closest to the duty cycle set for the first mode of operation of the lockup clutch.

6. The lockup clutch control apparatus as claimed in claim 1, wherein the setting device sets the initial value at a value closer to the duty cycle set for the first mode of operation of the lockup clutch as the sensed engine load increases.

7. The lockup clutch control apparatus as claimed in claim 6, wherein the setting device sets the initial value at a value closer to the duty cycle set for the first mode of operation of the lockup clutch as the sensed slip degree increases.

8. The lockup clutch control apparatus as claimed in claim 6, wherein the control unit calculates a first initial value closer to the duty cycle set for the first mode of operation of the lockup clutch as the sensed oil temperature decreases, calculates a second initial value closer to the duty cycle set for the first mode of operation of the lockup clutch as the sensed engine load increases, calculates a third initial value closer to the duty cycle set for the first mode of operation of the lockup clutch as the sensed slip degree increases, and sets the initial value of the duty cycle of the control signal at a selected one of the first, second and third initial values, the selected initial value being closest to the duty cycle set for the first mode of operation of the lockup clutch.

9. The lockup clutch control apparatus as claimed in claim 1, wherein the setting device sets the initial values at a value closer to the duty cycle set for the first mode of operation of the lockup clutch as the sensed slip degree increases.

10. The lockup clutch control apparatus as claimed in claim 9, wherein the control unit calculates a first initial value closer to the duty cycle set for the first mode of operation of the lockup clutch as the sensed oil temperature decreases, calculates a second initial value closer to the duty cycle set for the first mode of operation of the lockup clutch as the sensed engine load increases, calculates a third initial value closer to the duty cycle set for the first mode of operation of the lockup clutch as the sensed slip degree increases, and sets the initial value of the duty cycle of the control signal at a selected one of the first, second and third initial values, the selected initial value being closest to the duty cycle set for the first mode of operation of the lockup clutch.

11. The lockup clutch control apparatus as claimed in claim 1, wherein the control unit calculates a first initial value closer to the duty cycle set for the first mode of operation of the lockup clutch as the sensed oil temperature decreases, calculates a second initial value closer to the duty cycle set for the first mode of operation of the lockup clutch as the sensed engine load increases, calculates a third initial value closer to the duty cycle set for the first mode of operation of the lockup clutch as the sensed slip degree increases, and sets the initial value of the duty cycle of the control signal at a selected one of the first, second and third initial values, the selected initial value being closest to the duty cycle set for the first mode of operation of the lockup clutch.

* * * * *